(12) United States Patent
Tanimoto et al.

(10) Patent No.: US 11,824,168 B2
(45) Date of Patent: Nov. 21, 2023

(54) BATTERY

(71) Applicant: Prime Planet Energy & Solutions, Inc., Tokyo (JP)

(72) Inventors: Koichi Tanimoto, Takarazuka (JP); Kohji Umemura, Ono (JP); Tomokazu Yamanaka, Kakogawa (JP)

(73) Assignee: PRIME PLANET ENERGY & SOLUTIONS, INC., Tokyo (JP)

( * ) Notice: Subject to any disclaimer, the term of this patent is extended or adjusted under 35 U.S.C. 154(b) by 104 days.

(21) Appl. No.: 17/513,885

(22) Filed: Oct. 29, 2021

(65) Prior Publication Data

US 2022/0140405 A1 May 5, 2022

(30) Foreign Application Priority Data

Oct. 30, 2020 (JP) .................. 2020-182745

(51) Int. Cl.
*H01M 10/0587* (2010.01)
*H01M 4/70* (2006.01)

(52) U.S. Cl.
CPC ......... *H01M 10/0587* (2013.01); *H01M 4/70* (2013.01)

(58) Field of Classification Search
CPC ........................ H01M 10/0587; H01M 4/70

USPC ........................................................ 429/94
See application file for complete search history.

(56) References Cited

U.S. PATENT DOCUMENTS

| | | |
|---|---|---|
| 2013/0052520 A1 | 2/2013 | Kim et al. |
| 2018/0269449 A1 | 9/2018 | Okado et al. |
| 2018/0272456 A1* | 9/2018 | Kobayashi .......... H01M 50/533 |

FOREIGN PATENT DOCUMENTS

| | | |
|---|---|---|
| CN | 108630977 A | 10/2018 |
| CN | 108666630 A | 10/2018 |
| JP | 2013222517 A | 10/2013 |
| JP | 2017143004 A | 8/2017 |
| JP | 2019183856 A | 10/2019 |
| JP | 2020-057597 A | 4/2020 |

* cited by examiner

*Primary Examiner* — Cynthia H Kelly
*Assistant Examiner* — Omar M Kekia
(74) *Attorney, Agent, or Firm* — HAUPTMAN HAM, LLP

(57) ABSTRACT

A first angle ($\theta 1$) formed between a second straight line (L2) and a third straight line (L3) is more than 55°. A first length (D1) represents a straight line distance between a first point (A) and a second point (B), and a second length (D2) represents a length of a first electrode core body between the first point (A) and the second point (B). On this occasion, the second length (D2) is 1 time or more and 1.1 times or less as large as the first length (D1).

5 Claims, 3 Drawing Sheets

BATTERY

This nonprovisional application is based on Japanese Patent Application No. 2020-182745 filed on Oct. 30, 2020, with the Japan Patent Office, the entire contents of which are hereby incorporated by reference.

BACKGROUND OF THE INVENTION

Field of the Invention

The present disclosure relates to a battery.

Description of the Background Art

Conventionally, a metal-foil-concentrated portion located at an end portion of an electrode assembly and a current collecting terminal have been joined to each other by welding. Japanese Patent Laying-Open No. 2013-222517 (PTL 1) discloses that external force generated in a current collecting terminal is reduced by bifurcating a foil-concentrated joining portion of an electrode assembly.

In recent years, the following problem has arisen: an electrode assembly is expanded and contracted in the event of high-rate charging/discharging to squeeze out an electrolyte solution included in the electrode assembly, thus resulting in increased resistance. The conventional structure is not necessarily sufficient to solve such a problem.

SUMMARY OF THE INVENTION

An object of the present disclosure is to provide a battery to suppress a ratio of increase in resistance in the event of high-rate charging/discharging.

A battery according to the present disclosure includes: an electrode assembly in which a first electrode plate and a second electrode plate are wound around a winding axis with a separator being interposed between the first electrode plate and the second electrode plate, the electrode assembly having a flat shape, the first electrode plate including a first electrode core body, the second electrode plate including a second electrode core body. The electrode assembly has a first end portion and a second end portion located opposite to each other along a first direction parallel to the winding axis. The first electrode plate includes a first region and a second region, the first region being a region in which a first active material layer is formed on the first electrode core body, the second region being a region in which the first active material layer is not formed on the first electrode core body, the second region being located on the first end portion side with respect to the first region. The electrode assembly has a first outer surface and a second outer surface located opposite to each other along a second direction orthogonal to the first direction, and the second region of the wound first electrode plate is concentrated at the first end portion along the second direction, and a first current collector is connected to the concentrated second region at the first outer surface.

A first point (A) represents a point located in the first electrode plate at a boundary between the first region and the second region at an outermost circumference on the first outer surface side when viewed in a third direction orthogonal to the first direction and the second direction. A second point (B) represents an end portion of a connection surface of the first current collector connected to the second region of the first electrode plate, the end portion of the connection surface of the first current collector being located on the first region side when viewed in the third direction. A first straight line (L1) represents a straight line passing through a center of a thickness of the electrode assembly in the second direction and extending in parallel with the winding axis when viewed in the third direction. A second straight line (L2) represents a straight line extending in parallel with the first straight line (L1) and passing through the second point (B) when viewed in the third direction. A third straight line (L3) represents a straight line passing through the first point (A) and the second point (B) when viewed in the third direction. On this occasion, a first angle ($\theta 1$) formed between the second straight line (L2) and the third straight line (L3) is more than 55°.

Further, a first length (D1) represents a straight line distance between the first point (A) and the second point (B), and a second length (D2) represents a length of the first electrode core body between the first point (A) and the second point (B). On this occasion, the second length (D2) is 1 time or more and 1.1 times or less as large as the first length (D1).

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
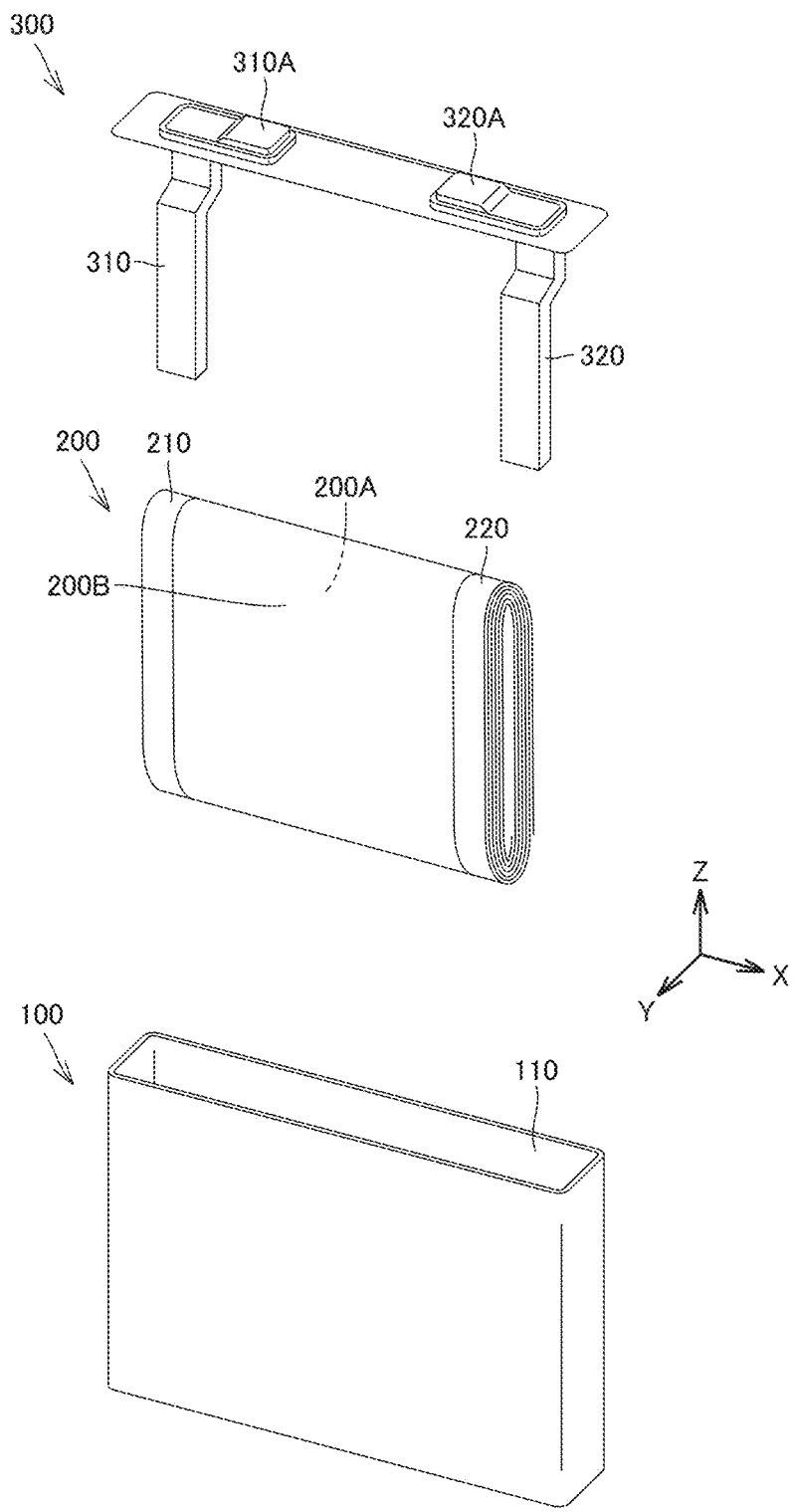
FIG. 1 is an exploded perspective view of a battery.

Hereinafter, embodiments of the present disclosure will be described. It should be noted that the same or corresponding portions are denoted by the same reference characters and may not be described repeatedly.

It should be noted that in the embodiments described below, when reference is made to number, amount, and the like, the scope of the present disclosure is not necessarily limited to the number, amount, and the like unless otherwise stated particularly. Further, in the embodiments described below, each component is not necessarily essential to the present disclosure unless otherwise stated particularly.

FIG. 1 is an exploded perspective view of a battery. As shown in FIG. 1, the battery according to the present embodiment includes a prismatic exterior body 100, an electrode assembly 200, and a cover member 300.

Prismatic exterior body 100 is provided with an opening 110 that opens upward. An electrolyte solution (not shown) is accommodated in prismatic exterior body 100 together with electrode assembly 200.

Electrode assembly 200 has a positive electrode 210 and a negative electrode 220 that are arranged side by side in an X axis direction (first direction). Electrode assembly 200 has an outer surface 200A (first outer surface) and an outer surface 200B (second outer surface) located opposite to each other along a Y axis direction (second direction).

Cover member 300 closes opening 110 of prismatic exterior body 100. Cover member 300 has an upper surface on which a positive electrode external terminal 310A and a negative electrode external terminal 320A are provided with a space being interposed therebetween in the X axis direction. A positive electrode side current collector 310 and a negative electrode side current collector 320 are provided on a lower surface of cover member 300. Positive electrode side current collector 310 is electrically connected to positive electrode external terminal 310A. Negative electrode side current collector 320 is electrically connected to negative electrode external terminal 320A.

Further, current collector 310 is connected to positive electrode 210 of electrode assembly 200, and current collector 320 is connected to negative electrode 220 of electrode assembly 200. Thus, positive electrode 210 and negative electrode 220 of electrode assembly 200 are electrically connected to positive electrode external terminal 310A and negative electrode external terminal 320A of cover member 300.

Figure 2:
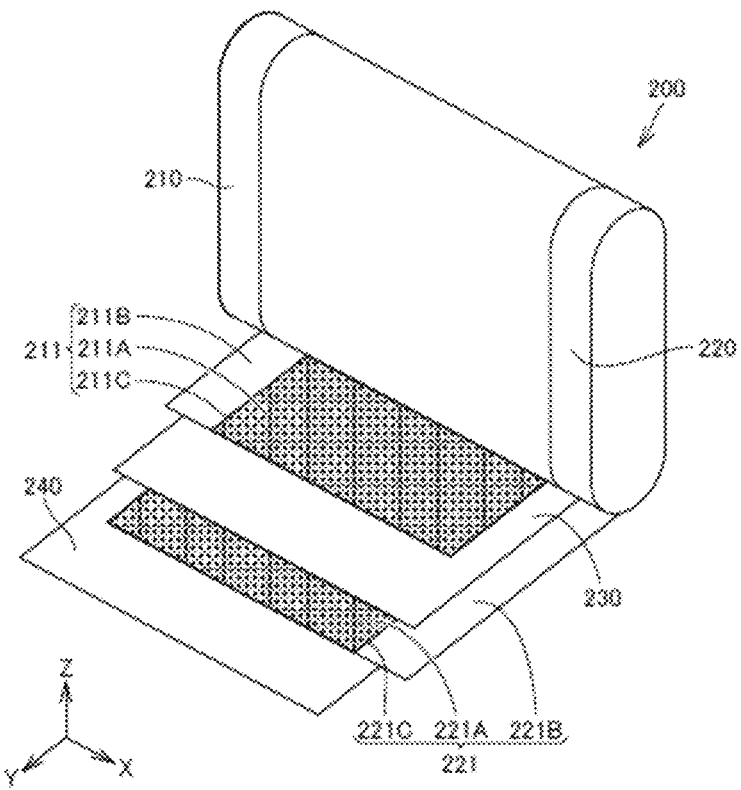
FIG. 2 is a diagram showing a configuration of an electrode assembly.

FIG. 2 is a diagram showing a configuration of electrode assembly 200. As shown in FIG. 2, electrode assembly 200 includes: a positive electrode plate 211 that forms positive electrode 210; a negative electrode plate 221 that forms negative electrode 220; and separators 230, 240.

Positive electrode plate 211 has: a first region 211A in which positive electrode active material composite layers (first active material layers) are formed on both surfaces of a positive electrode core body (first electrode core body) composed of an aluminum foil, each of the positive electrode active material composite layers including a positive electrode active material (for example, lithium nickel cobalt manganese composite oxide), a binder (for example, polyvinylidene difluoride (PVdF)), and a conductive material (for example, carbon material); a second region 211B in which the active material layers are not formed and the positive electrode core body is exposed; and a boundary 211C between first region 211A and second region 211B.

It should be noted that a protective layer (not shown) including alumina particles, a binder, and a conductive material may be provided on a portion of second region 211B (portion adjacent to first region 211A). In the present specification, it is assumed that the portion having the protective layer formed thereon is included in second region 211B.

Negative electrode plate 221 has: a first region 221A in which negative electrode active material layers (second active material layers) are formed on both surfaces of a negative electrode core body (second electrode core body) composed of a copper foil; a second region 221B in which the active material layers are not formed and the negative electrode core body is exposed; and a boundary 221C between first region 221A and second region 221B.

Positive electrode plate 211 and negative electrode plate 221 are wound around the X axis (winding axis) to form a flat shape with separators 230, 240 being interposed therebetween. In this way, electrode assembly 200 is formed to have: positive electrode 210 located on the one end portion (first end portion) side along the X axis direction (first direction); and negative electrode 220 located on the other end portion (second end portion) side.

Figure 3:
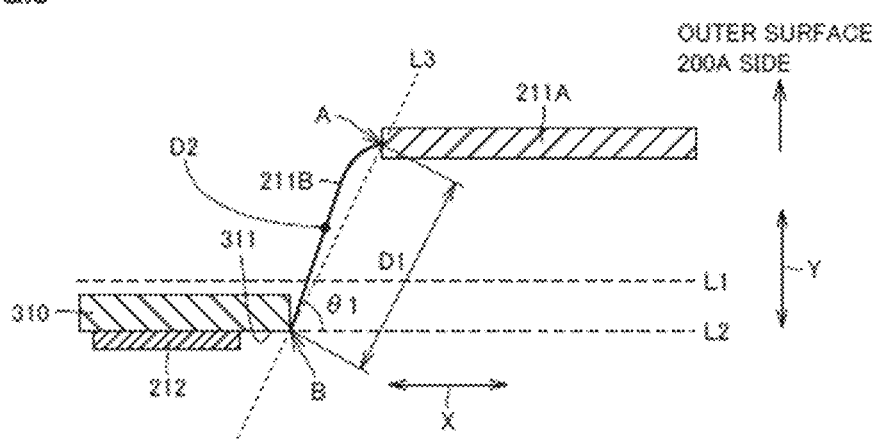
FIG. 3 is a first diagram showing a positional relation between an electrode plate and a current collector of the battery according to the embodiment.
Figure 4:
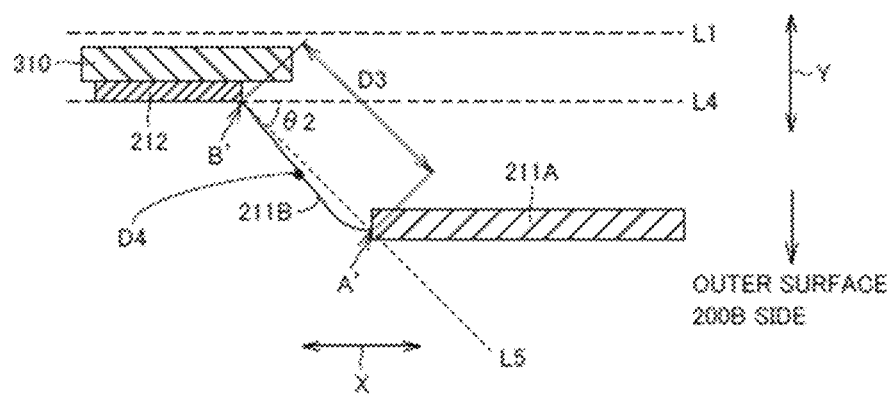
FIG. 4 is a second diagram showing a positional relation between the electrode plate and the current collector of the battery according to the embodiment.

FIG. 3 is a diagram showing a positional relation between positive electrode plate 211 on the outer surface 200A side and current collector 310. FIG. 4 is a diagram showing a positional relation between positive electrode plate 211 on the outer surface 200B side and current collector 310. The battery according to the present embodiment has one feature in terms of the positional relation between positive electrode plate 211 and current collector 310.

It should be noted that the following describes a structure of the end portion (first end portion) of electrode assembly 200 on the positive electrode 210 side; however, the same structure can be employed for the end portion (second end portion) of electrode assembly 200 on the negative electrode 220 side.

As shown in FIG. 3, at the end portion on the positive electrode 210 side, second region 211B of wound positive electrode plate 211 is concentrated along the Y axis direction (second direction). Current collector 310 (first current collector) is connected to concentrated second region 211B on the outer surface 200A side.

A point A (first point) shown in FIG. 3 corresponds to a point located in positive electrode plate 211 at a boundary between first region 211A and second region 211B at the outermost circumference on the outer surface 200A side (upper side in FIG. 3) of electrode assembly 200 when electrode assembly 200 is viewed in a Z axis direction (third direction). In first region 211A located on the center side (right side in FIG. 3) with respect to point A, positive electrode plate 211 is maintained to be flat.

A point B (second point) shown in FIG. 3 corresponds to an end portion of a connection surface 311 of current collector 310 connected to second region 211B of positive electrode plate 211, the end portion of connection surface 311 of current collector 310 being located on the first region 211A side (right side in FIG. 3) when electrode assembly 200 is viewed in the Z axis direction.

A straight line L1 (first straight line) shown in FIG. 3 is a straight line passing through the center of the thickness of electrode assembly 200 in the Y axis direction and extending in the X axis direction when electrode assembly 200 is viewed in the Z axis direction.

A straight line L2 (second straight line) shown in FIG. 3 is a straight line extending in parallel with straight line L1 and passing through point B when electrode assembly 200 is viewed in the Z axis direction. When electrode assembly 200 is viewed in the Z axis direction, straight line L2 is located opposite to point A with respect to straight line L1.

A straight line L3 (third straight line) shown in FIG. 3 is a straight line passing through point A and point B when electrode assembly 200 is viewed in the Z axis direction.

An angle θ1 (first angle) shown in FIG. 3 is an angle formed between straight line L2 and straight line L3, and v1>55° in the present embodiment.

Further, the following relation is satisfied between a straight line distance D1 (first length) between point A and point B and a length D2 (second length) of the positive electrode core body between point A and point B: 1≤D2/D1≤1. That is, D2 is more than or equal to D1 and is about 1.1 times or less as large as D1.

As shown in FIGS. 3 and 4, portions of concentrated positive electrode plate 211 are welded to each other to form a joining portion 212.

A point A' (third point) shown in FIG. 4 corresponds to a point located in positive electrode plate 211 at the boundary between first region 211A and second region 211B at the outermost circumference on the outer surface 200B side (lower side in FIG. 4) of electrode assembly 200 when electrode assembly 200 is viewed in the Z axis direction. In first region 211A located on the center side (right side in FIG. 4) with respect to point A', positive electrode plate 211 is maintained to be flat. A point B' (fourth point) shown in FIG. 4 corresponds to an end portion of joining portion 212 of the portions of positive electrode plate 211 on the first region 211A side (right side in FIG. 4) when electrode assembly 200 is viewed in the Z axis direction.

A straight line L4 (fourth straight line) shown in FIG. 4 is a straight line extending in parallel with straight line L1 and passing through point B' when electrode assembly 200 is viewed in the Z axis direction.

A straight line L5 (fifth straight line) shown in FIG. 4 is a straight line passing through point A' and point B' when electrode assembly 200 is viewed in the Z axis direction.

An angle θ2 (second angle) shown in FIG. 4 is an angle formed between straight line L4 and straight line L5, and θ2<θ1 in the present embodiment.

Further, the following relation is satisfied between a straight line distance D3 (third length) between point A' and point B' and a length D4 (fourth length) of the positive electrode core body between point A' and point B': 1≤D4/D3≤1.1. That is, D4 is more than or equal to D3 and is about 1.1 times or less as large as D3.

In the battery according to the present embodiment, as described above, straight line L3 is inclined at an angle (θ1) of more than 55° with respect to straight line L2. As a result, the end portion (point A) of first region 211A in which the active material layer is formed is comparatively strongly pressed to the center side in the thickness direction of electrode assembly 200. Thus, the electrolyte solution in electrode assembly 200 is less likely to be squeezed out to the outside of electrode assembly 200, thereby suppressing occurrence of shortage of the electrolyte solution in electrode assembly 200.

Further, since θ1 (angle formed between straight line L2 and straight line L3)>θ2 (angle formed between straight line L4 and straight line L5), the portion of positive electrode plate 211 located at the outermost circumference on the outer surface 200A side is pulled to the center side (the straight line L1 side) more strongly than the portion of positive electrode plate 211 located at the outermost circumference on the outer surface 200B side. On this occasion, the effect of suppressing the electrolyte solution from being squeezed out from electrode assembly 200 can be further improved as compared with a case where the portions of positive electrode plate 211 located at the outermost circumference on both the outer surfaces 200A and 200B sides are pulled to the center side with substantially the same magnitude of force.

Further, in the battery according to the present embodiment, since D2/D1≤1.1 and D4/D3≤1.1, deflection of the positive electrode core body at second region 211B on the current collector 310 side is small. Therefore, the portion of positive electrode plate 211 located at the outermost circumference of electrode assembly 200 can be strongly pulled to the center side (the straight line L1 side) in the thickness direction of electrode assembly 200, thereby further improving the effect of suppressing the electrolyte solution from being squeezed out from electrode assembly 200.

Figure 5:
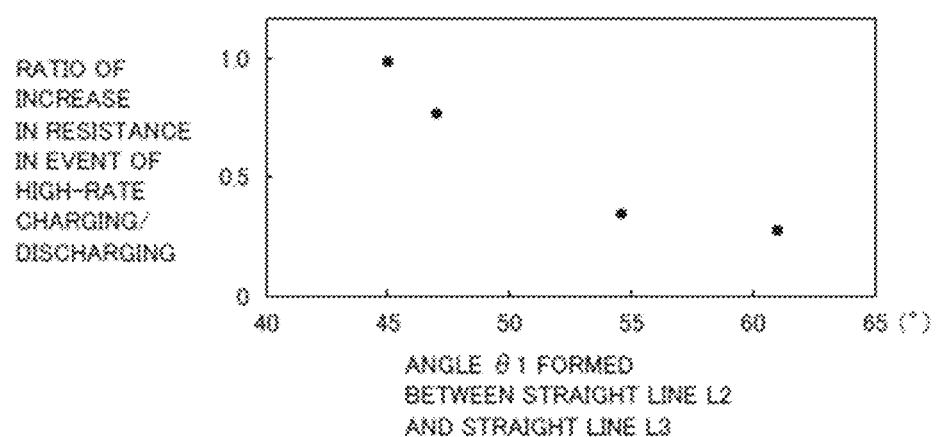
FIG. 5 is a diagram showing a correlation between an angle $\theta 1$ formed between a straight line L2 and a straight line L3 and a ratio of increase in resistance in the event of high-rate charging/discharging.

Next, referring to FIG. 5, the following describes a correlation between angle θ1 formed between straight line L2 and straight line L3 and a ratio of increase in resistance in the event of high-rate charging/discharging. The horizontal axis in FIG. 5 represents angle θ1 between straight line L2 and straight line L3 in an experiment sample. The vertical axis in FIG. 5 represents a numerical value (ratio) corresponding to the ratio of increase in resistance (=(the resistance in the event of the high-rate charging/discharging−the initial resistance)/the initial resistance) in the event of the high-rate charging/discharging when assuming that the ratio of increase in resistance measured when θ1=45° is "1".

It should be noted that the "initial resistance" herein is a value obtained in the following manner: the battery according to the experiment sample was charged to 3.7 V, was then discharged at a current value of 20 C for 10 seconds under an environment of 25° C., voltage was measured 10 seconds after the start of discharging, and IV resistance (electric resistance) was calculated based on the result of measurement.

Further, the "resistance in the event of the high-rate charging/discharging" herein indicates resistance after 2000 cycles, one cycle being represented by the following flow of procedure: the battery according to the experiment sample is charged at a current value of 30 C for 10 seconds, resting is provided for 10 seconds, the battery according to the experiment sample is discharged at a current value of 1 C for 300 seconds, and then resting is provided for 10 seconds.

As shown in FIG. 5, it was observed that when θ1 is more than or equal to about 55°, the ratio of increase in resistance in the event of the high-rate charging/discharging apparently tends to be low. In view of the result shown in FIG. 5, it is understandable that according to the battery according to the present embodiment (θ1>55°, the electrolyte solution can be suppressed from being squeezed out from electrode assembly 200, thereby suppressing an increase in resistance in the event of the high-rate charging/discharging.

Although the present invention has been described and illustrated in detail, it is clearly understood that the same is by way of illustration and example only and is not to be taken by way of limitation, the scope of the present invention being interpreted by the terms of the appended claims.

What is claimed is:
1. A battery, comprising:
an electrode assembly in which a first electrode plate and a second electrode plate are wound around a winding axis with a separator being interposed between the first electrode plate and the second electrode plate, the electrode assembly having a flat shape, the first electrode plate including a first electrode core body, the second electrode plate including a second electrode core body, wherein
the electrode assembly has a first end portion and a second end portion located opposite to each other along a first direction parallel to the winding axis,
the first electrode plate includes a first region and a second region, the first region being a region in which a first active material layer is formed on the first electrode core body, the second region being a region in which the first active material layer is not formed on the first electrode core body, the second region being located on the first end portion side with respect to the first region,
the electrode assembly has a first outer surface and a second outer surface located opposite to each other along a second direction orthogonal to the first direction,
the second region of the wound first electrode plate is concentrated at the first end portion along the second direction, and a first current collector is connected to the concentrated second region at the first outer surface,
a first point represents a point located in the first electrode plate at a boundary between the first region and the second region at an outermost circumference on the first outer surface side when viewed in a third direction orthogonal to the first direction and the second direction, a second point represents an end portion of a connection surface of the first current collector connected to the second region of the first electrode plate, the end portion of the connection surface of the first current collector being located on the first region side when viewed in the third direction, a first straight line represents a straight line passing through a center of a thickness of the electrode assembly in the second direction and extending in parallel with the winding axis when viewed in the third direction, a second straight line represents a straight line extending in parallel with the first straight line and passing through the second point when viewed in the third direction, a third straight line represents a straight line passing through the first point and the second point when viewed in the third direction, a first angle formed between the second straight line and the third straight line is more than 55°, a first length represents a straight line distance between the first point and the second point, a second length represents a length of the first electrode core body between the first point and the second point, and the second length is 1 time or more and 1.1 times or less as large as the first length, in the concentrated second region, portions of the wound first electrode plate are joined to each other to form a joining portion of the portions of the first electrode plate, a third point represents a point located in the first electrode plate at the boundary between the first region and the second region at the outermost circumference on the second outer surface side when viewed in the third direction, a fourth point represents an end portion of the joining portion on the first region side when viewed in the third direction, a fourth straight line represents a straight line extending in parallel with the first straight line and passing through the fourth point when viewed in the third direction, a fifth straight line represents a straight line passing through the third point and the fourth point when viewed in the third direction, a second angle formed between the fourth straight line and the fifth straight line is smaller than the first angle, and a third length represents a straight line distance between the third point and the fourth point, a fourth length represents a length of the first electrode core body between the third point and the fourth point, and the fourth length is 1 time or more and 1.1 times or less as large as the third length.

2. The battery according to claim 1, wherein when viewed in the third direction, the second straight line is located opposite to the first point with respect to the first straight line.

3. The battery according to claim 1, wherein the first electrode plate is a positive electrode plate.

4. The battery according to claim 3, wherein a protective layer is formed on a portion of the second region of the first electrode plate in a vicinity of the first region.

5. The battery according to claim 1, wherein the first electrode plate is a negative electrode plate.

* * * * *